United States Patent [19]

Baker et al.

[11] Patent Number: 5,380,465
[45] Date of Patent: * Jan. 10, 1995

[54] EMULSIFIERS FOR POLYMERIZATION PROCESS

[75] Inventors: Alan S. Baker, Slough; Stephen J. Butterworth, Chesham; Jheeta K. Ravinder, Slough, all of England

[73] Assignee: Imperial Chemical Industries PLC, London, England

[*] Notice: The portion of the term of this patent subsequent to Nov. 22, 2005 has been disclaimed.

[21] Appl. No.: 130,415

[22] Filed: Oct. 1, 1993

Related U.S. Application Data

[60] Continuation of Ser. No. 693,016, Apr. 29, 1991, abandoned, which is a continuation of Ser. No. 428,028, Oct. 27, 1989, abandoned, which is a continuation of Ser. No. 268,701, Nov. 8, 1988, abandoned, Division of Ser. No. 895,851, Aug. 12, 1986, Pat. No. 4,786,681.

[30] Foreign Application Priority Data

Sep. 5, 1985 [GB] United Kingdom ............... 8522052

[51] Int. Cl.⁶ .................... B01F 17/00; B01J 13/00
[52] U.S. Cl. .................... 252/356; 252/351; 252/309; 526/911; 523/502
[58] Field of Search ............ 252/309, 351, 356; 523/502; 524/713, 723, 724; 526/911; 548/545, 413, 415

[56] References Cited

U.S. PATENT DOCUMENTS

| | | | |
|---|---|---|---|
| 2,182,178 | 12/1939 | Pinkernelle | 548/545 |
| 3,255,108 | 6/1966 | Weise | 252/32.7 E |
| 3,269,946 | 8/1966 | Wiese | 252/32.5 |
| 3,347,645 | 10/1967 | Pietsch et al. | 252/402 X |
| 3,381,022 | 4/1968 | LeSuer | 252/407 X |
| 3,502,677 | 3/1970 | LeSuer | 548/413 X |
| 3,997,492 | 12/1976 | Kane | 260/29.6 WQ |
| 4,250,050 | 2/1981 | Asbeck et al. | 524/723 X |
| 4,368,133 | 11/1983 | Forsberg | 252/75 |
| 4,517,102 | 5/1985 | Salathiel et al. | 252/309 X |
| 4,588,786 | 5/1986 | Kadono et al. | 548/415 X |
| 4,672,090 | 6/1987 | Chan | 252/309 |
| 4,708,753 | 11/1987 | Forsberg | 252/309 X |
| 4,784,784 | 11/1988 | Dohner | 252/79 |
| 4,786,681 | 11/1988 | Baker et al. | 252/309 X |
| 4,904,401 | 2/1990 | Ripple et al. | 252/51.5 A |

*Primary Examiner*—Robert L. Stoll
*Assistant Examiner*—Daniel S. Metzmaier
*Attorney, Agent, or Firm*—Cushman, Darby & Cushman

[57] ABSTRACT

The invention provides a process for producing a water-in-oil emulsion of a water-soluble polyacrylamide or polyacrylic acid polymer or copolymer by the inverse emulsion process characterised in that there is used as the emulsifying agent for the water-in-oil emulsion a water-insoluble, oil-soluble surface active agent of the formula (I):

X-Y-Z  I or a functional derivative thereof, wherein X- represents a saturated or unsaturated hydrocarbon chain containing from 30 to 500 carbon atoms, -Y- represents a succinic anhydride residue carried terminally upon the group X-, and -Z represents a hydrophilic group carried by the group -Y-.

14 Claims, No Drawings

EMULSIFIERS FOR POLYMERIZATION PROCESS

This is a continuation of application Ser. No. 07/693,016, filed Apr. 29, 1991, which is a continuation of Ser. No. 07/428,028 filed Oct. 27, 1989, which was a continuation of Ser. No. 07/268,701 filed Nov. 8, 1988 all of which were abandoned upon the filing hereof; and also which was a divisional of Ser. No. 06/895,851 filed Aug. 12, 1988 allowed on Jun. 8, 1988 U.S. Pat. No. 4,786,681.

The present invention relates to a polymerisation process, notably to one in which specified surface active agents are used in an inverse emulsion process to achieve increased solids content of the polymer product in the emulsion; and to a polymer emulsion.

The inverse aqueous emulsion polymerisation of acrylamide, either alone or in conjunction with other ethylenically unsaturated monomers, is described, for instance, in U.S. Pat. No. 3,284,393. The procedure differs from conventional aqueous emulsion polymerisation in that the material undergoing polymerisation consists of an emulsion in a continuous oil phase of an aqueous solution of a water-soluble monomer prepared with the aid of a water-in-oil emulsifier rather than of an emulsion in an aqueous continuous phase of a water-immiscible monomer prepared with the aid of an oil-in-water emulsifier. The process is of particular interest for the preparation of water-soluble polymers such as polyacrylamide, which are extensively used as flocculants, for example in sewage treatment. The resulting emulsions have the valuable property that, when appropriately formulated, they readily invert on being diluted into water; in this way an aqueous solution of the high molecular weight polymer is obtained much more readily than by dissolution of the equivalent polymer isolated in powder form. In order for this approach to be commercially attractive, however, it is desirable that the content of polymer solids in the emulsions should be as high as possible, consistent with the emulsion having a low enough viscosity for it to be easily handled.

Accordingly, many proposals have been made with the objective of enhancing the solids content of inverse emulsions without incurring a high viscosity penalty. Aside from the relatively unattractive device of concentrating an emulsion of low solids, most of these proposals have centered around the selection of particular improved water-in-oil emulsifiers for use in the inverse polymerisation process. As an instance of this, there may be mentioned U.S. Pat. No. 4,339,371 according to which the emulsifier employed is a particular copolymer of an unsaturated hydrocarbon and maleic anhydride with the stated result that the polymer solids content can be raised thereby from the hitherto attainable levels of 20-30% to a level of 40-60%.

We have now found that a certain class of surface-active compound not previously proposed for use in inverse emulsion polymerisation offers significant advantages in such a process not only in enabling emulsions viscosities to be kept low at high polymer solids contents but also in reducing the input of energy which is necessary in order to form the initial emulsion of the aqueous monomer solution in the oil phase and furthermore in enhancing the stability of the polymer emulsions obtained.

Accordingly, the present invention provides a process for producing a water-in-oil emulsion of a water-soluble polyacrylamide or polyacrylic acid polymer or copolymer by the inverse emulsion process characterised in that there is used as the emulsifying agent for the water-in-oil emulsion a water-insoluble, oil-soluble surface active agent of the formula (I):

$$X\text{-}Y\text{-}Z \qquad \text{I}$$

or a functional derivative thereof, wherein X- represents a saturated or unsaturated hydrocarbon chain containing from 30 to 500 carbon atoms, -Y- represents a succinic anhydride residue carried terminally upon the group X-; and -Z represents a hydrophilic group carried by the group -Y-.

The invention also provides a water-in-oil emulsion having an acrylamide or acrylic acid homopolymer or copolymer dissolved in the aqueous phase thereof, characterised in that there is used as emulsifying agent for the emulsion a compound of formula (I) as defined above or a functional derivative thereof, notably in an amount of from 2 to 25% by weight of the oil present. Preferably the emulsion contains at least 45% by weight of the polymer and has a viscosity of less than 90 poise as determined using a Brookfield viscometer. It is particularly preferred that the compound of formula (I) be used in combination with a surface active agent having a hydrophilic/lipophilic balance value of less than 15, such as those selected from alkylene oxide condensates of alkylphenols or sorbitan esters or from salts of dialkyl esters of sulphosuccinic acid.

The group X is preferably obtained by the polymerisation of one or more olefins, notably by the copolymerisation of a mono-olefin containing from 1 to 6 carbon atoms, e.g. ethylene, propylene, but-1-ene or isobutylene. These polymers can be made by standard methods. The polymers have a terminal double bond that can be reacted with maleic anhydride in the presence of a standard condensation catalyst for example a halogen, such as bromine to form a compound of formula (II):

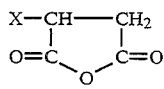

The compounds of formula (II) are commercially available and can be used in the form in which they are available without further purification.

Preferred compounds of formula (II) for present use are poly(isobutenyl)succinic anhydrides with number average molecular weights in the range 400 to 5000.

The group Z in the compound of formula (I) is preferably a polar group carrying a substituent which reacts with the carboxylic anhydride group of the compound of formula (II). For example, the group Z can be derived from an alcohol or polyol; or from an amine or polyamine; or from a compound carrying both hydroxyl and amino groups. Thus, the group Z can be derived from ethylene glycol, propylene glycol, glycerol, trimethylolpropane, pentaerythritol or sorbitol; from ethylenediamine, trimethylenediamine, hexamethylenediamine, tetraethylenepentamine, dimethylaminopropylamine, diethylaminopropylamine; from monoethanolamine, diethanolamine, dipropanolamine, tris(hydroxymethyl)aminomethane or dimethylaminoethanol. If desired, the groups Z can be derived from compounds having other active groups in addition to the hydroxyl and/or amino groups. For example, such other groups can be carboxylic acid groups, and the group Z is derived for example from glycine or glycollic acid.

In practice the compounds of formula (I) are obtained as a complex mixture of isomers which may be regarded as having the following as major components:

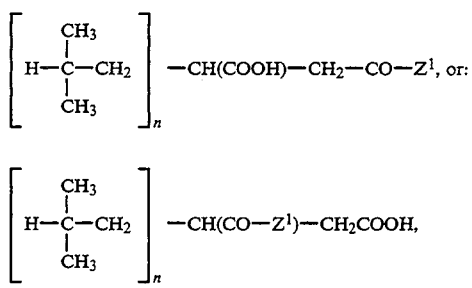

wherein n has an approximate value of from 7 to 100 such that the compound has a molecular weight in the range 400–5000 and $Z^1$ is a straight or branched alkyl group carrying hydroxyl, amino and/or carboxylic acid substituents, the alkyl group being bonded to the CO group through the residue of a hydroxyl or amino group; and functional derivatives thereof.

The compounds of formula (I) can be used as such or in the form of a functional derivative thereof. Thus, in the case of compounds having a residual carboxylic acid group in the group Z, the compounds may be used in the form of salts thereof with inorganic bases, such as sodium or potassium salts or ammonium salts, or as salts with an amine or an aminoalcohol. The invention also includes within its scope acid ester and acid amide derivatives of compounds of formula (I) containing free hydroxyl or free amino groups, the derivatives being formed by the reaction of the compound of formula (I) with phosphoric, sulphuric, chlorosulphonic or sulphate acids or a halo-alkyl or halo-alkaryl sulphonic or phosphonic acid or haloalkanoic acid for example chloromethylsulphonic acid, chloroethylsulphonic acid, chloroethylphosphoric acid, chloromethylbenzenesulphonic acid, chloromethylbenzenephosphonic acid and chloracetic acid. These derivatives can themselves be used to form salts with inorganic bases, amines or aminoalcohols.

The compounds of formula (I) are readily prepared by reacting the appropriate polyalk(en)yl succinic anhydride with the appropriate polar compound at a temperature of from 70° to 150° C. in an inert solvent or diluent, for example xylene. Reaction is continued until a substantially constant acid value is achieved. Preferably, the reagents are used in substantially equimolar proportions based on the anhydride ring and the hydroxyl or amino groups, so as to produce a half derivative of the succinic group having a free carboxylic acid group obtained by the opening of the anhydride ring.

Where the acid ester or acid amide derivative is to be produced, the half derivative is reacted in a second stage with the mineral or organic acid referred to above, preferably in substantially stoichiometric proportions, until a substantially constant acid value is obtained. Thus, where a mineral acid is used, this second stage reaction is carried out at a temperature of about 70° C. for 3 hours without the removal of water to reduce the risk of dehydration of the product. However, where chlorosulphonic acid is used, higher temperatures, e.g. up to 180° C., may be used. Where a polybasic acid is used, it is preferred to react only one of the ionisable hydrogens on the acid.

The salts of the half derivatives of the succinic acid intermediates or the products of the second stage reaction can readily be produced by reaction of the intermediate or final product with a suitable base. Usually the salts are prepared in situ by preparation of the half derivative in an alkaline medium.

In the process of the invention, the compound of formula (I) is used as the emulsifying agent in the inverse emulsion polymerisation of acrylamide, acrylic acid and its salts homopolyers or copolymers. The invention can thus be applied to the polymerisation of the monomers of acrylamide or acrylic acid alone or with each other or with water-soluble monomers such as methacrylamide, methacrylic acid and their salts, ethylacrylate, methylmethacrylate, dimethylaminoethyl(meth)acrylate, diethylaminoethyl(meth)acrylate, hydroxyethyl(meth)acrylate, quaternary salts of dimethylaminoethylmethacrylate with methyl sulphate or methyl chloride, 3-(methylacrylamido)propyl trimethylammonium chloride, diallyldimethylammonium chloride, 2-acrylamido-2-methylpropane sulphonic acid and its salts, vinyl pyridine and vinyl pyrrolidone.

The monomer or mixture of monomers to be polymerised is normally used as an aqueous solution, preferably containing 50 to 90% by weight of the monomer(s), optionally containing such other additives or constituents as are used in the free radical polymerisation of monomers, for example ammonium ferrous sulphate or the sodium salt of ethylenediamine tetra-acetic acid.

The compound of formula (I) is dissolved, optionally with warming to 40° to 50° C. in the oil phase into which the aqueous phase is to be emulsified. The oil phase is typically a paraffinic or aromatic hydrocarbon and preferably contains from 2 to 25% by weight of the compound of formula (I) dissolved therein.

In one embodiment of the invention, the compound of formula (I) is used in combination with one or more conventional surface active agents having a hydrophilic/lipophilic balance value below 15, preferably below 12. Examples of such surface active agents for present use include alkylene oxide condensates of aliphatic alcohols or alkylphenols, notably ethylene oxide condensates of octyl, nonyl or dodecyl phenols, sorbitan esters and their alkylene oxide condensates, and salts of dialkyl esters of sulphosuccinic acid. The ratio of conventional surface active agent to compound of formula (I) can be from 4:1 to 1:4 (for example 1:1) without deleterious effect upon the operation of the process of the invention. In some cases the presence of the conventional surface active agent may aid inversion of the polymer emulsion produced by the process of the invention.

The aqueous phase is then emulsified in the oil phase. Preferably, the aqueous phase is added continuously or batchwise to the oil phase and emulsification achieved by agitating the mixture, preferably by means of a high shear mixer, to achieve a substantially homogeneous emulsion. Other components required to bring about polymerisation of the monomer(s) in the aqueous phase, for example peroxide and metabisulphite polymerisation initiators, are conveniently added to the emulsion; and polymerisation is carried out in the normal manner.

The product of the process of the invention is a solution of the polymer in the water phase of the emulsion. As indicated above, the process of the invention enables the production of emulsions containing a high content of polymer, typically in excess of 40% by weight thereof, whilst retaining sufficiently low viscosity, typically below 90 poise as measured using a Brookfield viscometer, for the polymer emulsion to be handled readily. Such emulsions can be inverted by the addition of water thereto to form aqueous solutions of the polymer which find use, inter alia, as flocculating agents.

The present invention will now be illustrated by the following Examples in which all parts and percentages are given by weight unless stated otherwise.

General Preparative Method

An oil phase B was prepared by dissolving the surface active agent or mixture of surface active agents in a paraffinic hydrocarbon having a boiling point in the range 190° to 240° C. An aqueous monomer phase A was prepared by dissolving the monomer or mixture of monomers, a sodium salt of ethylenediamine tetra-acetic acid, ammonium ferrous sulphate and ammonia solution or concentrated hydrochloric acid in demineralised water. The aqueous phase was added in a slow stream over a period of 2–3 minutes to the oil phase with agitation using a Silverson Model L2R high shear mixer to ensure uniform incorporation and to avoid formation of an oil-in-water emulsion. The resulting water-in-oil emulsion was then homogenised at high speed for 4 minutes.

The resultant emulsion was transferred to a 2 liter glass vessel fitted with a 7.5 cm diameter paddle agitator capable of operating at 300 to 450 rpm. An initiation charge C containing an aqueous solution of tert-butyl hydroperoxide was added with stirring and the vessel purged with nitrogen for 15 minutes at a flow rate of approximately 1000 ml per minute. The nitrogen flow rate was then reduced to approximately 250 ml per minute and the temperature of the mixture adjusted to 40° C. A weak aqueous solution of sodium metabisulphite D was added over a period of 2 hours, whilst maintaining the temperature at 40° C. A more concentrated solution of sodium metabisulphite E was then added as a "mop up charge" to complete the polymerisation. When the reaction had subsided, the temperature was adjusted back to 40° C. and an aqueous or an alcoholic solution of inverting agents F was added over a period of 30 minutes to produce a stable water-in-oil emulsion of the polymer. The solids content and viscosity of the emulsion were measured.

Inversion Test Method

Sufficient of the emulsion produced as above was quickly added to demineralised water rapidly stirred in a beaker using a magnetic stirrer to produce a 1% solids content aqueous solution of the polymer. The appearance of the emulsion was noted after 5 minutes stirring and again after it had stood 2 hours. The emulsion was considered acceptable if it dispersed rapidly to give a uniform milky fluid during the 5 minute period and if it showed no more than slight signs of separation after standing.

Freeze-Thaw Stability Test Method

A further portion of the emulsion produced as above was held for 16 hours at −15° C., then for 8 hours at 25° C. and this cycle repeated three further times. The emulsion was considered acceptable if it showed only slight signs of separation at the end of the test cycles.

The above preparation was applied to the following two formulations using the special surface active agents of the invention set out in Tables I and II; and the results of the above tests for the various emulsions produced are set out in Tables III and IV.

COMPARATIVE EXAMPLES

The preparative method described above was repeated substituting the "special" surfactant with the same weight of an alternating copolymer made up of C18 olefin-derived units and maleic anhydride derived units. The polymer is sold by Gulf Oil under the Trade Name PA-18. The resultant polymer emulsion based on Formulation 1 was very viscous and stringy and failed the freeze/thaw test. When used in the preparation of Formulation II, the emulsion gelled during the polymerisation step to give an intractable mass.

When the above comparative example was repeated using a 1:1 weight mixture of the olefin/maleic anhydride surfactant and sorbitan mono-oleate in the preparation of an emulsion based on Formulation I and II, emulsions separated into two phases and failed the freeze/thaw test in both cases.

Formulation I

| Acrylamide/dimethylaminoethyl methacrylate copolymers | | |
|---|---|---|
| | | Parts |
| A | Monomer/aqueous phase | |
| | Acrylamide | 8.98 |
| | Dimethylaminoethyl methacrylate | 26.93 |
| | Demineralised water | 11.87 |
| | Sodium salt of ethylene diamine tetraacetic acid | 0.07 |
| | Ammonium ferrous sulphate | 0.07 |
| | Concentrated hydrochloric acid (to pH 3.0) | 5.93 |
| B | Oil phase | |
| | "Special" surfactant | 4.24 |
| | Paraffinic hydrocarbon, boiling range 190–214° C. | 23.80 |
| C | Initiator charge (i) | |
| | Tert-butyl hydroperoxide 0.01% aqueous solution | 0.74 |
| D | Initiator charge (ii) | |
| | Sodium metabisulphite, 0.01% aqueous solution | 1.08 |
| E | "Mop-up" charge | |
| | Sodium metabisulphate, 30% aqueous solution | 3.23 |
| F | Inverting agents | |
| | Calcium dodecylbenzenesulphonate, 70% in alcoholic solvent | 3.47 |
| | Condensate of sorbitan trioleate with 20 molar proportions of ethylene oxide | 9.59 |
| | | 100.00 |

Formulation II: Acrylamide/acrylic acid copolymers

| | | Parts |
|---|---|---|
| A | Monomer/aqueous phase | |
| | Acrylamide | 25.32 |
| | Acrylic acid | 10.86 |
| | Demineralised water | 20.74 |
| | Sodium salt of ethylene diamine tetraacetic acid | 0.07 |
| | Ammonium ferrous sulphate | 0.07 |
| | Ammonia solution, sp. gr. 0.88 (to pH 5.0) | 1.79 |

-continued

| | | Parts |
|---|---|---|
| B | Oil phase | |
| | "Special" surfactant | 4.27 |
| | Paraffinic hydrocarbon, boiling range 190–214° C. | 23.98 |
| C | Initiator charge (i) | |
| | Tert-butyl hydroperoxide, 0.01% aqueous solution | 0.75 |
| D | Initiator charge (ii) | |
| | Sodium metabisulphite, 0.01% aqueous solution | 1.09 |
| E | "Mop-up" charge | |
| | Sodium metabisulphate, 30% aqueous solution | 3.26 |
| F | Inverting agents | |
| | Condensate of nonylphenol (1 mol) with ethylene oxide (9 mols) | 2.07 |
| | Sodium di-(tridecyl)sulphosuccinate 70% solution | 5.73 |
| | | 100.00 |

TABLE I

| Composition of "Special" Surfactants | | |
|---|---|---|
| Surfactant Reference | Composition | Molar Ratio |
| A | PIBSA*/monethanolamine | 1:1 |
| B | PIBSA*/diethanolamine | " |
| C | PIBSA*/dimethylaminoethanol | " |
| D | PIBSA*/dimethylaminopropylamine | " |
| E | PIBSA*/diethylaminopropylamine | " |
| F | PIBSA*/glycerol | " |
| G | PIBSA*/ethylene glycol | " |
| H | PIBSA*/tetraethylenepentamine | " |
| I | PIBSA*/monethanolamine/ phosphoric acid | 1:1:1 |
| J | PIBSA*/diethanolamine/ phosphoric acid | " |
| K | PIBSA*/diethanolamine/ sulphuric acid | " |
| L | PIBSA*/glycolic acid | 1:1 |
| M | PIBSA*/glycerol/phosphoric acid | 1:1:1 |
| N | PIBSA*/glycine | 1:1 |

*PIBSA = poly(isobutenyl)succinic anydride m/w 1000

TABLE II

| Composition of Surfactant Blends | | |
|---|---|---|
| Surfactant Reference | Composition | Weight Ratio |
| O | Surfactant B + Conventional Surfactant X | 1:1 |
| P | Surfactant B + Conventional Surfactant Y | " |
| Q | Surfactant I + Conventional Surfactant X | " |
| R | Surfactant I + Conventional Surfactant Y | " |

In Table II the conventional surfactant X is a condensate of sorbitan mono-oleate with 5 molar proportions of ethylene oxide and conventional surfactant Y is sorbitan mono-oleate.

TABLE III

| Test results: Formulation I | | | | | |
|---|---|---|---|---|---|
| Surfactant | % solids content | Viscosity poise, 3/12 Brookfield | Average particle size m | Freeze thaw test | Inversion test |
| A | 49.1 | 78 | 0.80 | Pass | Pass |
| B | 51.1 | 68 | 0.83 | " | " |
| C | 50.0 | 82 | 1.14 | " | " |
| D | 49.0 | 38 | 0.96 | " | " |
| E | 49.3 | 68 | 1.24 | " | " |
| F | 51.4 | 29 | 0.45 | " | Some creaming |
| G | 51.3 | 86 | 0.67 | " | Pass |
| H | 48.6 | 71 | 0.47 | " | " |
| I | 49.7 | 55 | 0.57 | " | " |
| J | 48.4 | 8.5 | 0.40 | " | " |
| K | 47.7 | 20 | 0.88 | " | " |
| L | 48.7 | 78 | 0.58 | " | Some creaming |
| M | 49.4 | 88 | 0.60 | " | Pass |
| P | 49.7 | 80 | 0.65 | " | " |
| R | 49.0 | 70 | 0.50 | " | " |

TABLE IV

| Test Results: Formulation II | | | | | |
|---|---|---|---|---|---|
| Surfactant | % Solids Content | Viscosity poise, 3/12 Brookfield | Average particle size m | Freeze thaw test | Inversion test |
| B | 50.4 | 4.5 | 0.41 | Pass | Pass |
| I | 48.3 | 2.5 | 0.59 | " | " |
| N | 44.0 | 11.0 | 0.41 | " | " |
| O | 43.0 | 7.2 | 0.47 | " | " |
| Q | 44.0 | 10.5 | 0.71 | " | " |

We claim:

1. A composition comprising
(a) a water-insoluble, oil-soluble surface active agent of the formula (I):

$$X-Y-Z \qquad (I)$$

or a salt thereof; and
(b) a surface active accent having a hydrophilic/lipophilic balance value of below 15 and selected from the group consisting of a sorbitan ester and an alkylene oxide condensate of a sorbitan ester; wherein:
X represents a saturated or unsaturated hydro-carbon chain containing from 30 to 500 carbon atoms;
Y is carried terminally upon a group X and is a half derivative of a succinic anhydride group having a free optionally salified carboxylic acid group and obtained by the opening of the anhydride ring in the reaction of the succinic anhydride group with a compound containing the group Z; and
Z represents a hydrophilic group carried by the group Y and is derived from an alcohol, a polyol, an amine, a polyamine, a compound containing both hydroxyl and amino groups or a compound containing carboxylic acid groups in addition to the hydroxyl and/or amino groups.

2. The composition of claim 1 wherein component (a) is the reaction product of a polyalk(en)yl succinic anhydride with an aliphatic polyol, polyamine, aminoalcohol, hydroxycarboxylic acid or aminocarboxylic acid.

3. The composition of claim 2 wherein component (a) has been further reacted with phosphoric acid, sulphuric acid, chlorosulphonic acid, sulphamic acid, a halo-alkyl sulphonic acid, a halo-alkyl or halo-alkaryl phosphonic acid, or a halo-alkanoic acid.

4. The composition of claim 2 wherein component (a) is a complex mixture of isomers having as the major components compositions of the formula:

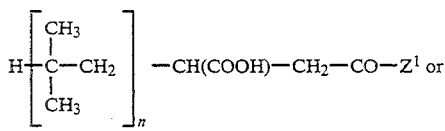

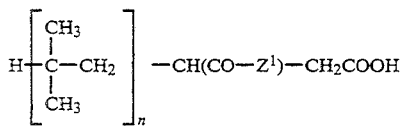

wherein n has an approximate value of from 7 to 100 such that the compound has a molecular weight in the range of 400–5000; and $Z^1$ is a straight or branched alkyl group carrying hydroxyl, amino and/or carboxylic acid substituents, the alkyl group being bonded to the CO group through the residue of a hydroxyl or amino group; and salt thereof.

5. The composition of claim 2 wherein the weight ratio of component (a) to component (b) is in the ratio 4:1 to 1:4.

6. A composition comprising
(a) a water-insoluble, oil-soluble surface active agent which is the reaction product of a polyalk(en)yl succinic anhydride with an aliphatic polyol, polyamide, aminoalcohol, hydroxycarboxylic acid or aminocarboxylic acid, or a salt thereof; and
(b) a surface active agent having a hydrophilic/lipophilic balance value below 15 and selected from the group consisting of a sorbitan ester and an alkylene oxide condensate of a sorbitan ester, wherein the weight ratio of component (a) to component (b) is in the range 4:1 to 1:4.

7. The composition of claim 6 wherein component (a) is a complex mixture of isomers having as the major components compositions of the formula:

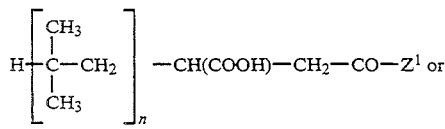

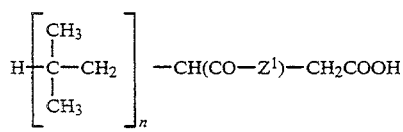

wherein n has an approximate value of from 7 to 100 such that the compound has a molecular weight in the range 400–5000; and $Z^1$ is a straight or branched alkyl group carrying hydroxyl, amino and/or carboxylic acid substituents, the alkyl group being bonded to the CO group through the residue of a hydroxyl or amino group; and salt thereof.

8. The composition of claim 7 wherein component (b) is sorbitan mono-oleate or a condensate of ethylene oxide with sorbitan mono-oleate.

9. A composition comprising
(a) a water-insoluble, oil-soluble surface active agent of the formula (I):

X-Y-Z          (I)

or a salt thereof; and
(b) a surface active agent having a hydrophilic/lipophilic balance value of below 15 and selected from the group consisting of a sorbitan ester and an alkylene oxide condensate of a sorbitan ester;

wherein:
X- represents a saturated or unsaturated hydro-carbon chain containing from 30 to 500 carbon atoms;
-Y- is carried terminally upon a group X- and is a half derivative of a succinic anhydride group having a free optionally salified carboxylic acid group and obtained by the opening of the anhydride ring in the reaction of the succinic anhydride group with a compound containing the group Z; and
-Z- represents a hydrophilic group carried by the group Y axed is derived from an amine, a polyamine, a compound containing both hydroxyl and amino groups or a compound containing carboxylic acid groups in addition to the hydroxyl and/or amino groups.

10. The composition of claim 9 wherein component (a) is the reaction product of a polyalk(en)yl succinic anhydride with a polyamine, aminoalcohol, hydroxycarboxylic acid or aminocarboxylic acid.

11. The composition of claim 10 wherein component (a) has been further reacted with phosphoric acid, sulphuric acid, chloro-sulphonic acid, sulphamic acid, a halo-alkyl sulphonic acid, a halo-alkyl or halo-alkaryl phosphonic acid, or a halo-alkanoic acid.

12. The composition of claim 10 wherein component (a) is the reaction product of a polyalk(en)yl succinic anhydride with an aminoalcohol.

13. The composition of claim 10 wherein component (b) is sorbitan monooleate or a condensate of ethylene oxide with sorbitan monooleate.

14. The composition of claim 13 wherein the weight ratio of component (a) to component (b) is in the range 4:1 to 1:4.

* * * * *